UNITED STATES PATENT OFFICE.

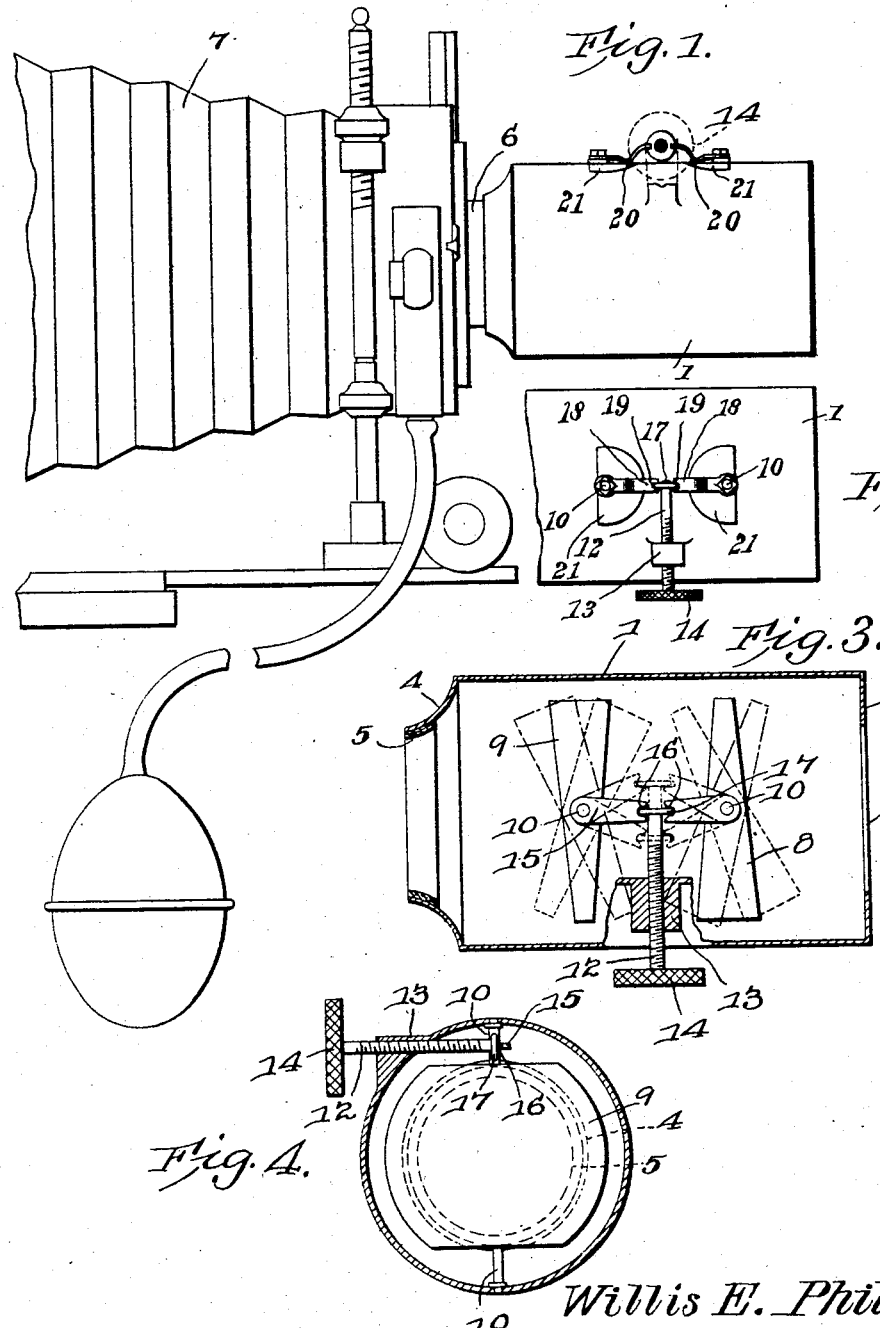

WILLIS E. PHILLIPS, OF COLLBRAN, COLORADO.

CAMERA ATTACHMENT.

No. 818,553.   Specification of Letters Patent.   Patented April 24, 1906.

Application filed November 9, 1905. Serial No. 286,532.

*To all whom it may concern:*

Be it known that I, WILLIS E. PHILLIPS, a citizen of the United States, residing at Collbran, in the county of Mesa and State of Colorado, have invented a new and useful Camera Attachment, of which the following is a specification.

This invention relates to photography, and has for its object to provide for correcting certain objectionable features whereby photographs will more nearly approach the impression given to the eyes of the beholder of the object photographed. In this connection it is a well-known fact that noticeably tall objects appear taller to the eye than they really are, and the same thing is true of noticeably broad objects. For instance, the letter "T," when its two parts have the same length, the stem or upright portion has the appearance of being longer than the head or cross portion to the majority of eyes. In photographs, the ordinary optical impression, as hereinbefore explained, is not produced, as the photograph is mathematically or proportionately true of the object photographed, and by reason of its reduced size it does not give to the eye the same impression as the original, wherefore photographs are ordinarily unsatisfactory to the eye, particularly in portrait photography.

As hereinbefore indicated, it is the prime object of the present invention to correct the objection noted and to have the photograph give the same proportionate impression as obtained by the eye when viewing the original. To carry out this object, I have provided an attachment for application to any ordinary camera whereby the light-rays from the object being photographed may be refracted before striking the lens, the refraction of course being controlled in order that the image upon the ground glass may be brought to the relative proportions as seen by the eye when viewing the original. It is also proposed to embody the attachment in the nature of a complete device capable of being readily applied to the lens tube or barrel of any ordinary camera without requiring any change or alteration therein, to enable the adjustment of the attachment so as to correct the objections noted, to distort an image to the extent of caricature, and to enable the production of a true image, as in the ordinary camera, without necessitating the removal of the device.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a fragmentary side elevation of the bellows and lens portion of a conventional form of camera having the attachment of the present invention fitted thereto. Fig. 2 is a plan view of the attachment. Fig. 3 is an enlarged longitudinal sectional view of a modified arrangement of the attachment. Fig. 4 is a cross-sectional view of Fig. 3.

Like characters of reference designate corresponding parts in all of the figures of the drawings.

The device of the present invention includes a tubular case 1, which is open at opposite ends and is preferably provided at its forward end with an internal annular flange 2 to somewhat reduce the exposure-opening 3 at the front of the case. The rear end of the case is provided with a reduced portion 4, which is cylindrical in shape and provided with a lining 5 of felt or other similar material capable of affording a light-excluding joint when the reduced terminal 4 is placed upon the lens-tube 6 of any conventional form of camera, such as is shown at 7 in Fig. 1 of the drawings.

Within the case 1 is a pair of transparent prisms 8 and 9, disposed in opposite relation—that is to say, with the base of one prism extending in the direction of the apex of the other prism, each of which is provided with diametrically opposite trunnions 10, having bearings in opposite sides of the case, whereby the angular disposition of the prism may be adjusted. These prisms are spaced one in front of the other, and when disposed in parallelism, as shown by full lines in Fig. 3 of the drawings, the refraction produced by the first prism 8 is corrected by the second prism 9, wherefore the light-rays strike the lens in the same relation as when the prisms are not in place. By tilting the prisms to the same extent from their normal relation to the positions shown by the dot-and-dash lines the refraction of the light-rays caused by the prisms will reduce the width of the image and thereby give the same an apparent increase in length. By adjusting the prisms in the opposite direction to the positions shown by the dotted lines the refraction will be the reverse—that is to say, the image will be widened and therefore have the impression of being shortened. By careful adjustment of the prisms the image upon the ground glass may be brought to a precise reproduction of the impression received by the eye when viewing the original. Furthermore, by materially increasing and decreasing the refraction and also by adjusting the prisms to individually different angles from their normal positions the image may be distorted to the point of caricature. The case is also capable of being rotated upon the lens-tube, whereby the image may be distorted diagonally, wherefore a great variety of distortions may be produced, which permits of the production of an image precisely as the eye sees the original and at the same time permits of an infinite number of distortions for the production of caricatures.

For convenience in adjusting the prisms, as in Figs. 3 and 4, I employ a threaded stem 12, which passes through a threaded bearing 13, consisting of a boss or enlargement upon the exterior of the case, the outer end of the stem being provided with a suitable finger-piece 14, while its inner end lies within the case between the prisms, but beyond the field thereof. Upon the adjacent trunnion of each prism there is a crank-arm 15, extending toward the adjusting-stem 12, the free end of the crank-arm being notched or bifurcated, as at 16, to rotatably receive the circular or disk-like head 17, fixed upon the inner end of the threaded stem. By rotating the finger-piece 14 to the right the threaded stem may be moved inwardly and the prisms adjusted to the positions shown by the dot-and-dash lines, while a reverse rotation of the finger-piece will swing the prisms to the positions shown by the dotted lines.

In practice the camera is focused in the usual manner, and then the finger-piece 14 is manipulated to adjust the prisms until the image upon the ground glass gives the same impression as that obtained by the eye when viewing the original. This feature of the invention is particularly useful in portrait photography, as it is a well-known fact that photographic images of many people do not give the ordinary optical impression, and therefore the photographs are oftentimes unsatisfactory on account of the true reproduction rather than through any fault of the photographer. This objection can be readily cured or corrected by means of the present attachment without in any manner impairing the likeness and, on the other hand, giving the true likeness as appreciated by the eye when viewing the original The arrangement shown in Figs. 3 an 4 permits corresponding adjustments only of the prisms, and in order that the prisms may be individually adjusted I employ the means shown in Figs. 1 and 2, wherein the trunnions 10 project externally of the case and carry spring-arms 18, each of which has its free end bifurcated, as at 19, to receive the disk 17 upon the inner end of the threaded adjusting member 12, as hereinbefore described. By reason of the elasticity of the arms 18 they may be individually lifted or sprung out of engagement with the adjusting-stem and then moved to adjust the corresponding prism independently of the other prism. By preference each spring-arm has a depression 20 to frictionally bear against a flat boss 21, provided upon the exterior of the case, whereby the crank-arm and the corresponding prism may be held against accidental movements when adjusted independently of the adjusting-stem 12.

Having thus described the invention, what is claimed is—

1. A camera attachment comprising a frame provided at one end with an exposure-opening and having its other end formed for connection with the lens-tube of a camera, front and rear prisms mounted within the frame, and means to tiltably adjust the prisms.

2. A camera attachment comprising a tube which is provided at its front end with an exposure-opening and has its rear end provided with a coupling to embrace the lens-tube of a camera, front and rear prisms within the frame, and means to adjustably tilt the prisms.

3. A camera attachment comprising a tube which is provided at its front end with an exposure-opening and has its rear end reduced and open to form a coupling for embracing the lens-tube of a camera, front and rear prisms within the tube, and means for tiltably adjusting the prisms.

4. A camera attachment comprising a frame provided at one end with an exposure-opening and at its opposite end with means for engagement with a lens-tube, front and rear prisms pivotally supported within the frame, and means to tiltably adjust the prisms upon their pivotal supports.

5. A camera attachment comprising a tube provided at its forward end with an exposure-opening and having its rear end formed for engagement with the lens-tube of a camera, front and rear prisms pivoted within the tube and means carried by one side of the tube for adjustably turning the prisms upon their pivots.

6. A camera attachment comprising a tube provided at its forward end with an exposure-opening and having its rear end formed for engagement with the lens-tube of a camera, front and rear prisms pivoted within the tube, and a threaded adjusting-stem carried by the tube and associated with the prisms to pivotally adjust the same.

7. A camera attachment comprising a tube provided at its forward end with an exposure-opening and having its rear end formed for engagement with the lens-tube of a camera, front and rear prisms pivoted within the tube, crank-arms carried by the pivots of the prisms, and an adjusting device carried by the tube and associated with the crank-arms.

8. A camera attachment comprising a tube provided at its forward end with an exposure-opening and having its rear end formed for engagement with the lens-tube of a camera, front and rear prisms pivoted within the tube, crank-arms carried by the pivots of the prisms, and a threaded adjusting-stem carried by the tube and provided at its inner end with a circular head, the crank-arms being provided with seats receiving the head of the adjusting-stem.

9. A camera attachment comprising a tube which is provided at its front end with an exposure-opening and has its rear end formed for engagement with the lens-tube of a camera, front and rear prisms within the tube, and means to adjust the prisms, said tube being rotatable upon its longitudinal axis when associated with the lens-tube.

10. The combination with the lens-tube of a camera, of a light-refracting device rotatably associated with the lens-tube and including front and rear prisms.

11. A camera attachment comprising a tube provided at its forward end with an exposure-opening and having its rear end formed for engagement with the lens-tube of a camera, front and rear prisms pivoted within the tube and having trunnions projecting upon the exterior of the tube, crank-arms carried by the projected portions of the trunnions and provided with bifurcated free ends, and a threaded adjusting-stem carried by the case and having a circular head working in the bifurcation of the crank-arms.

12. A camera attachment comprising a tube provided at its forward end with an exposure-opening and having its rear end formed for engagement with the lens-tube of a camera, front and rear prisms pivoted within the tube, and means to simultaneously tilt the prisms to corresponding angular adjustments and to permit individual adjustments of the prisms.

13. A camera attachment comprising a tube provided at its forward end with an exposure-opening and having its rear end formed for engagement with the lens-tube of a camera, front and rear prisms pivoted within the tube, and means to simultaneously adjust the prisms to corresponding angles, each prism capable of being disconnected from the adjusting means to permit individual adjustment thereof.

14. A camera attachment comprising a tube provided at its forward end with an exposure-opening and having its rear end formed for engagement with the lens-tube of a camera, front and rear prisms pivoted within the tube, crank-arms carried by the prisms, and adjusting means associated with the crank-arms, each crank-arm capable of being disassociated with the adjusting means to permit individual adjustment of the corresponding prism.

15. A camera attachment comprising a tube provided at its forward end with an exposure-opening and having its rear end formed for engagement with the lens-tube of a camera, front and rear prisms pivoted within the tube, elastic crank-arms for the prisms, and an adjusting element associated with the crank-arms, each crank-arm capable of being sprung out of engagement with the adjusting devices to permit individual adjustment of the corresponding prism, the tube being provided with friction-surfaces against which the crank-arms bear to hold the same against looseness when disengaged from the adjusting devices.

16. A camera attachment comprising a tube provided at its forward end with an exposure-opening and having its rear end formed for engagement with the lens-tube of a camera, front and rear prisms pivoted within the tube, trunnions for the prisms piercing the tube, spring crank-arms carried by the projected portions of the trunnions and having their free ends bifurcated, and a threaded adjusting-stem mounted upon the tube and provided with a circular head received within the bifurcations of the crank-arms, each crank-arm capable of being sprung out of engagement with the head to permit individual adjustment of the corresponding prism, the tube being provided with flat external bosses beneath the crank-arms and the crank-arms having bowed portions to frictionally bear upon the bosses for holding the crank-arms against looseness when disengaged from the adjusting-stem.

In testimony that I claim the foregoing as my own I have hereto affixed my signature in the presence of two witnesses.

WILLIS E. PHILLIPS.

Witnesses:
ROLLIN C. PHIPPS,
MAGGIE PHIPPS.